United States Patent [19]

Vlasak

[11] 3,959,984

[45] June 1, 1976

[54] MOTOR PROTECTION APPARATUS USING FUSIBLE LINKS

[75] Inventor: Robert Vlasak, Toledo, Iowa

[73] Assignee: Lennox Industries Inc., Marshalltown, Iowa

[22] Filed: Nov. 29, 1974

[21] Appl. No.: 528,273

[52] U.S. Cl. ............................ 62/229; 317/40 R; 219/210
[51] Int. Cl.² .................. H02H 5/04; F25B 49/00
[58] Field of Search .......... 62/229; 317/13 B, 13 C, 317/40 R; 337/107; 219/210

[56] References Cited
UNITED STATES PATENTS

| 2,470,257 | 5/1949 | Moore | 317/60 R |
| 3,038,056 | 6/1962 | Wolfskill | 219/210 |
| 3,414,704 | 12/1968 | Flanagan | 219/210 |
| 3,656,023 | 4/1972 | Hadfield | 317/40 R |
| 3,766,437 | 10/1973 | Fritts | 317/40 R |
| 3,852,648 | 12/1974 | Barry et al. | 62/230 |

Primary Examiner—William E. Wayner
Attorney, Agent, or Firm—Allegretti, Newitt, Witcoff & McAndrews

[57] ABSTRACT

The disclosure describes improved apparatus for protecting the motor of a refrigerant compressor. The apparatus includes fusible links and a magnetic contactor connected in series between a source of three-phase AC voltage and the compressor motor. If the contactor fails in the closed position, a relay energizes resistors which heat the links. In response to the heat, the links are switched to an open circuit condition that disconnects the compressor from the source of AC voltage.

6 Claims, 4 Drawing Figures

MOTOR PROTECTION APPARATUS USING FUSIBLE LINKS

BACKGROUND AND SUMMARY OF THE INVENTION

This invention relates to refrigerant compressors and, more particularly, relates to apparatus for protecting the electric drive motor of a refrigerant compressor.

A variety of devices have been produced for the purpose of protecting three-phase AC motors. Some of these devices include the provision of first and second switches arranged so that the first switch will open to disconnect the motor from its voltage source in the event that the second switch fails in the closed position.

Such devices are illustrated in U.S. Pat. No. 2,470,257 (Moore - May 17, 1949) and U.S. Pat. No. 3,656,023 (Hadfield - Apr. 11, 1972). Each of these patents illustrates a protection circuit in which a main or working contactor normally controls the flow of electrical current to a three-phase motor. A safety switch is normally closed and is opened only if the working contactor fails in the closed position. The applicant has discovered that this arrangement has a number of disadvantages which are overcome by the present invention. A normally closed safety switch has a tendency to stick in the closed position due to ordinary wear and contamination. Contamination may result from insect juices, which are sticky and gluelike. As a result, after a period of time in field service, the safety switch becomes ineffective and useless as a safety switch.

In order to overcome the deficiencies of the prior art, the applicant has discovered that a compressor motor can be safely protected by a single switch and fusible link means connected in series between the motor and a source of AC voltage. If the switch fails in the closed position, the fusible link means are heated in order to switch them to an open circuit condition that disconnects the motor from the voltage source.

Accordingly, it is a principal object of the present invention to provide a switch and fusible link means connected in series between a compressor motor and an AC source, and means for heating the link means if the switch fails in the closed position.

Still another object of the invention is to provide a switching arrangement of the foregoing type in which the fusible link means is contained within a resistor which forms the means for heating so that the heat transfer between the link means and heater means is improved.

Yet another object of the invention is to provide a switching arrangement of the foregoing type in which the resistor that heats the fusible link means comprises PTC material. This feature enables the resistor to be driven from a power source over a wide range of voltages without changing resistor values.

By using a fusible link arrangement of the foregoing type, compressor motors can be protected with a degree of reliability and economy heretofore unattainable.

BRIEF DESCRIPTION OF THE DRAWING

These and other objects, advantages and features of the present invention will hereafter appear in connection with the accompanying drawing wherein.

DETAILED DESCRIPTION OF THE PREFERRED EMBODIMENT

Figure 1:
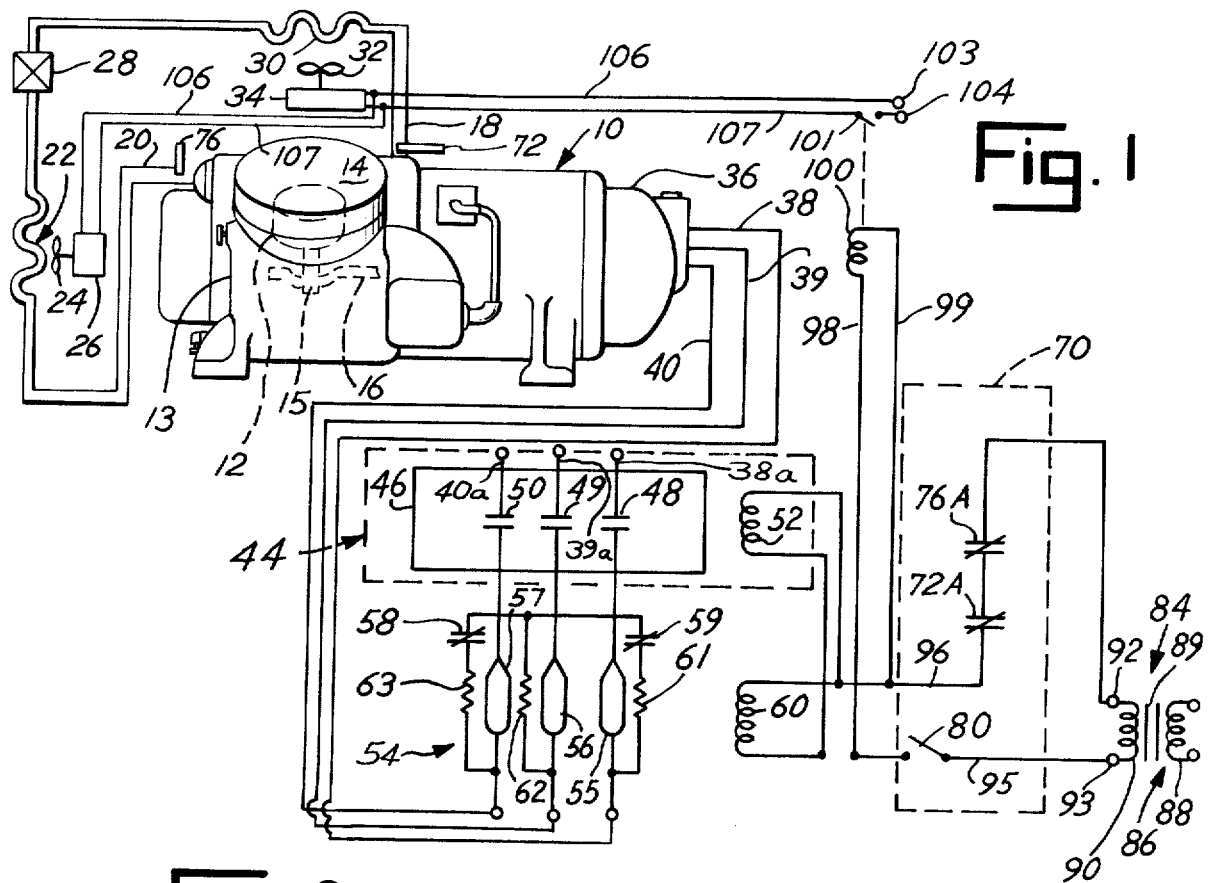
FIG. 1 is a schematic drawing of a preferred form of the switching apparatus made in accordance with the present invention for use in connection with a conventional compressor.

Referring to FIG. 1, a preferred form of the present invention may be used in connection with a conventional refrigerant compressor 10 comprising a piston 12 which reciprocates in a cylinder 13 covered by a cylinder head 14. The piston is driven by a connecting rod 15 through a rotating crank shaft 16. The compressor 10 is in a refrigeration system including a suction line 18 through which relatively low pressure refrigerant gas or suction gas is drawn into the cylinder above piston 12. The piston compresses the refrigerant gas in a well-known manner and transmits the compressed gas through a discharge line 20 to a conventional condenser coil 22. The compressed gas in the condenser coil is cooled and thereby liquified by air from condenser fan 24 that is driven by electric motor 26.

The refrigerant is passed through a thermal expansion device, e.g., valve 28 and an evaporator coil 30. A fan 32 driven by an electric motor 34 circulates the air over coil 30 and the cooled air passes into a space, such as a room which is to be cooled.

A conventional three-phase compressor motor 36 drives crank shaft 16 in a conventional manner. Three-phase AC current is received by the motor through conductors 38–40 and like conductors 38A–40A, the conductors being separated by a magnetic contactor 44.

A preferred form of switching apparatus for use in connection with compressor 10 basically comprises a magnetic contactor 44, a fusible link and heater assembly 54, a pilot or operating circuit 70 and a generator circuit 84.

Magnetic contactor 44 comprises a switch assembly 46 including normally open ganged switches 48–50 that are controlled by an operating coil 52. Assembly 54 comprises fusible links 55–57 connected in series with conductors 38A–40A, respectively. Normally closed relay contacts 58, 59 are opened by the magnetic field created in a coil 60 in response to a pilot signal. If no pilot current is flowing through coil 60 and switches 48–50 are stuck in the closed position, ceramic resistors 61–63 provide heat to links 55–57, respectively, so that the links are switched to an open circuit condition.

Operating circuit 70 comprises a low pressure sensor 72 mounted in suction line 18 which opens normally closed contacts 72A when the pressure in suction line 18 decreases below a predetermined value. Circuit 70 also includes a high pressure sensor 76 located in discharge line 20 which opens normally closed contacts 76A when the pressure in discharge line 20 exceed a predetermined value. A thermostatic switch 80 opens when the environment temperature to be controlled by the compressor decreases below a predetermined value. Switch 80 may include a conventional thermostat, such as a mercury ball enclosed in a glass envelope mounted on a bimetallic coil which rotates the envelope in response to fluctuations in temperature.

Generating circuit 84 comprises a step down transformer 86 including a primary 88 which is magnetically coupled to a secondary 90 by a core 89. Secondary 90 steps down the primary source to 24 volts AC measured across terminals 92 and 93. The signal generated by the secondary 90 is a pilot signal which is conducted through the pilot circuit by conductors 95 and 96. Additional conductors 98 and 99 are connected from the pilot circuit to a conventional relay coil 100 which closes a normally open contact 101 in response to the pilot signal. Contact 101 completes the circuit from terminals 103, 104 to fan motors 26 and 34 through conductors 106 and 107. Terminals 103 and 104 are connected to a source of single phase electrical power.

Figure 2:
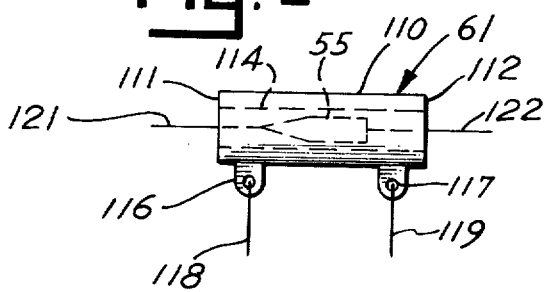
FIG. 2 is a front elevational view of a heating resistor and fusible link arranged in heat transfer relationship in accordance with the invention.
Figure 3:
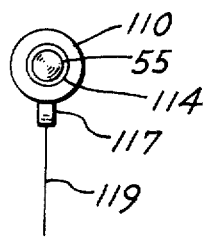
FIG. 3 is an end elevational view of the apparatus shown in FIG. 2.

Fusible links 55–57 are identical and resistors 61–63 are identical. They can be understood with reference to FIGS. 2–4 in which exemplary link 55 and resistor 61 are shown. Resistor 61 comprises a generally cylindrical body 110 having end surfaces 111 and 112 and a central cylindrical cavity 114. The resistor has end terminals 116, 117 that are connected to lead wires 118, 119. Fusible link 55 is placed in heat transfer relationship with resistor 61 by locating it in cavity 114 as shown. Resistor 61 preferably comprises a thermistor having a positive temperature coefficient. That is, resistor 61 is fabricated from positive temperature coefficient (PTC) material, which, in a steady state condition, will dissipate heat at a constant rate over a wide variation in supply voltage and current. By using PTC material in resistor 61, fusible link 55 can be accurately controlled in spite of wide fluctuations in the voltage applied to terminals 38A, 39A and 40A.

Figure 4:
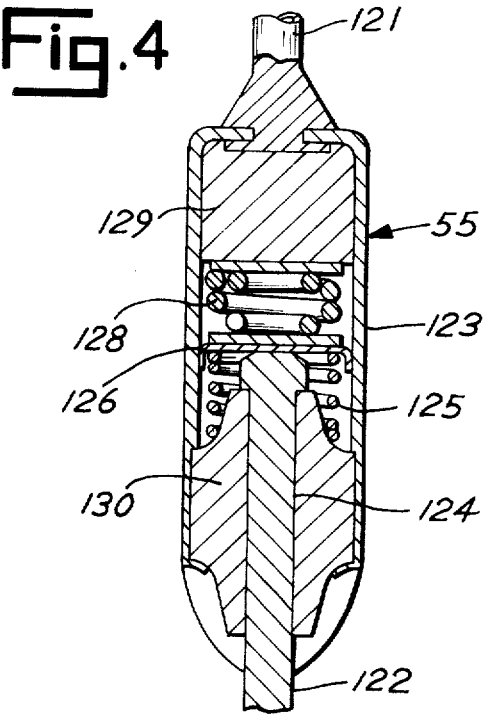
FIG. 4 is a cross-sectional view of a preferred form of link shown in FIG. 1.

Referring to FIG. 4, link 55 comprises lead wires 121 and 122 which extend into a conducting case assembly 123. Wire 122 is integrally formed with a conductive plunger 124. A trip spring 125 normally holds plunger 124 in contact with a contact 126. A compression spring 128, a thermal pellet 129 and a ceramic bushing 130 complete the link. If the temperature of the link exceeds a predetermined value, the thermal pellet melts and releases the springs which separate the plunger from the contact so that the normally closed circuit between wires 121 and 122 is interrupted. Links of the type described are manufactured by Micro Devices Corp., Dayton, Ohio, under the name Microtemp Thermal Cutoffs.

The embodiment shown in FIG. 1 operates in the following manner. Assuming the contacts and switches are in their normal positions shown in FIG. 1, no electrical current is transmitted through conductors 38–40, to motor 36, and compressor 10 is not operating. As soon as the temperature of the environment being controlled exceeds the predetermined value established by thermostatic switch 80, switch 80 closes so that the pilot signal is conducted through operating coils 52 and 60. In response to the pilot signal, operating coil 52 creates a magnetic field which closes switching assembly 46 so that switches 48–50 are moved to their closed positions.

Operating coil 60 generates a magnetic field which moves contacts 58, 59 to their open positions. At this point in time, switch assembly 46 is closed, links 55–57 are conductive, and three-phase electrical current is transmitted by conductors 38–40 to motor 36, so that compressor 10 begins to operate. At the same time, switch 80 is closed, the pilot signal is transmitted through relay coil 100 so the contact 101 is closed and fan motors 26 and 34 begin to operate. As the compressor 10 operates, the temperature of the environment being controlled decreases.

As soon as the temperature decreases below a value determined by the setting of thermostatic switch 80, switch 80 opens so that the pilot signal is no longer transmitted through operating coils 52 and 60. As a result, switching assembly 46 is moved to its open position and the operation of motor 36 and compressor 10 is discontinued. Contactor 44 is biased so that switch assembly 46 is normally moved to its open position absent a magnetic field created by operating coil 52. When switch 80 opens, the pilot signal through relay coil 100 is interrupted so that contact 101 opens, and fan motors 26 and 34 no longer operate. In addition, the pilot signal no longer flows through coil 60, so that contacts 58, 59 are moved to their normally closed positions.

In the event that switches 48–50 stick in the closed position after thermostatic switch 80 is open, current continues to flow through links 55–57, and compressor 10 continues to operate. Due to the closed condition of contacts 58, 59 current flows through resistors 61–63, thereby generating heat that is transferred to links 55–57. As soon as links 55–57 are heated to a predetermined temperature, they are switched to their open-circuit state, and the electrical power to the compressor motor is interrupted.

Those skilled in the art will recognize that the preferred embodiments described are merely exemplary of the present invention and may be altered and modified without departing from the true spirit and scope of the invention as defined in the appended claims.

What is claimed is:

1. In a refrigerant compressor of the type having a compression mechanism for receiving a refrigerant gas from a suction line, compressing the refrigerant gas and discharging the compressed refrigerant gas, a motor for operating the compression mechanism and conductor means comprising a first, second and third conductor for applying three-phase electrical power to the motor, improved apparatus for protecting the compressor motor comprising in combination:

first switch means comprising a magnetic contactor connected in series with the conductor means, said switch means being movable between an open position and a closed position;

fusible link means connected in series with the first switch means, said fusible link means being normally in a closed circuit condition and being switchable to an open circuit condition in response to a range of temperatures greater than a predetermined temperature, said fusible line means comprising a first link connected in series with the first conductor, a second link connected in series with the second conductor and a third link connected in series with the third conductor;

heater means comprising a first and second resistor connected in series between the first and second conductors and a third resistor operatively connected between the junction of the first and second resistors and the third conductor and being in heat transfer relationship with the fusible link means;

first operating means comprising first coil means for generating a magnetic field capable of operating the magnetic contactor for moving the first switch means to the closed position in response to a pilot signal and for opening the first switch means in the absence of the pilot signal;

generating means for generating the pilot signal in response to a demand for operation of the compressor; and second operating means responsive to the closed position of the first switch means and the absense of the pilot signal and comprising a relay responsive to the pilot signal for generating a magnetic field capable of opening normally closed relay contacts connected to the heater means for enabling the heating means to receive electrical power so that the fusible link means is heated to the predetermined temperature, whereby the motor is disconnected from the electrical power, said relay contacts comprising a first contact connected between the first and second resistors and a second contact connected between the second and third resistors.

2. Apparatus, as claimed in claim 1, wherein the generating means comprises a transformer for generating the pilot signal and a thermostat connected in series with the transformer.

3. Apparatus, as claimed in claim 1, wherein each resistor defines a cavity and wherein a link of the fusible link means is positioned in the cavity.

4. Apparatus, as claimed in claim 3, wherein the cavity is cylindrical and extends through the resistor.

5. Apparatus, as claimed in claim 1, wherein the fusible link means comprises:

a plunger;

a contact; and a bias spring normally holding the plunger in electrical contact with the contact, the bias spring being operable to disengage the plunger from the contact if the temperature of the link means exceeds the predetermined temperature.

6. Apparatus, as claimed in claim 1, wherein the heater means comprises PTC material.

* * * * *